(12) United States Patent
Waibel (10) Patent No.: US 7,695,539 B2
(45) Date of Patent: Apr. 13, 2010

(54) FILTER ELEMENT AND FILTER HOUSING SUITABLE FOR ACCOMMODATION THE SAME

(75) Inventor: Hans Waibel, Remseck/Aldingen (DE)

(73) Assignee: Mahle International GmbH, Stuttgart (DE)

( * ) Notice: Subject to any disclaimer, the term of this patent is extended or adjusted under 35 U.S.C. 154(b) by 267 days.

(21) Appl. No.: 11/994,257

(22) PCT Filed: Jun. 23, 2006

(86) PCT No.: PCT/DE2006/001069

§ 371 (c)(1),
(2), (4) Date: Dec. 28, 2007

(87) PCT Pub. No.: WO2007/003159

PCT Pub. Date: Jan. 11, 2007

(65) Prior Publication Data

US 2008/0196368 A1 Aug. 21, 2008

(30) Foreign Application Priority Data

Jul. 2, 2005 (DE) .................. 10 2005 031 058

(51) Int. Cl.
*B01D 46/00* (2006.01)
(52) U.S. Cl. .................. 55/502; 55/385.3; 55/498; 55/503
(58) Field of Classification Search .......... 55/337, 55/348, 385.3, 495, 498, 502, 503, 521
See application file for complete search history.

(56) References Cited

U.S. PATENT DOCUMENTS 6,179,890 B1 * 1/2001 Ramos et al. .................. 55/482

(Continued)

FOREIGN PATENT DOCUMENTS

DE 33 32 103 7/1984

(Continued)

OTHER PUBLICATIONS

English Abstract provided for DE-33 32 103.

(Continued)

*Primary Examiner*—Michael A Marcheschi
*Assistant Examiner*—Robert A Clemente
(74) *Attorney, Agent, or Firm*—Rader, Fishman & Grauer PLLC (57) ABSTRACT

Disclosed is a filter element (3) comprising a cylindrical, porous, longitudinally penetrated filter material core (5) and a frame (6) that tightly surrounds one end of the core in a radial direction and is provided with scaling and holding means via which the filter element (3) can be removably and tightly inserted into a filter housing (1, 2). In order to be able to produce said filter element (3) efficiently, embody the same so as to make it easy to handle, and mount the same in a dividable filter housing so as to make it easy to replace, such a filter element is characterized by the following features:—the frame (6) encompasses a first annular groove (10) that is open towards the filter material core (5);—said first annular groove (10) is entirely filled with a foamed filling material (11);—the foamed filling material is produced from a liquid which is filled for foaming purposes into the first annular groove (10) resting against the filter material core (5) through an inlet (27) that is located in the first annular groove (10).

20 Claims, 6 Drawing Sheets

U.S. PATENT DOCUMENTS

| | | | |
|---|---|---|---|
| 6,610,126 B2 * | 8/2003 | Xu et al. | 95/273 |
| 6,966,940 B2 * | 11/2005 | Krisko et al. | 55/497 |
| 6,997,968 B2 * | 2/2006 | Xu et al. | 55/495 |
| 7,008,467 B2 * | 3/2006 | Krisko et al. | 95/268 |
| 7,318,851 B2 * | 1/2008 | Brown et al. | 55/498 |
| 7,491,254 B2 * | 2/2009 | Krisko et al. | 55/337 |
| 2007/0137152 A1 * | 6/2007 | Xu et al. | 55/321 |
| 2007/0175187 A1 * | 8/2007 | Kopec et al. | 55/385.3 |
| 2008/0307759 A1 * | 12/2008 | Reichter et al. | 55/428 |

FOREIGN PATENT DOCUMENTS

| | | |
|---|---|---|
| EP | 0 900 118 | 4/1997 |
| EP | 1 380 334 | 7/2003 |
| EP | 1 391 234 | 7/2003 |
| EP | 1 582 248 | 1/2005 |
| WO | WO-02/20135 | 3/2002 |
| WO | WO-03/084341 | 10/2003 |

OTHER PUBLICATIONS

English Abstract provided for EP-1 391 234.
English Abstract provided for EP-1 380 334.

* cited by examiner

FILTER ELEMENT AND FILTER HOUSING SUITABLE FOR ACCOMMODATION THE SAME

CROSS-REFERENCES TO RELATED APPLICATION

This application is a U.S. national phase of international application PCT/DE2006/001069 filed Jun. 23, 2006, which claims priority to German application DE 10 2005 031 058.3 filed Jul. 2, 2005, which are hereby incorporated by reference in their entirety.

The invention relates to a filter element and a filter housing suitable for accommodating same, in which the filter element comprises a cylindrical porous filter material core through which the flow can pass in the direction of the axis of the cylinder and a frame that surrounds the filter material core radially with a tight seal at one end and with sealing and holding means by which the filter element is tightly insertable into a filter housing.

The filter material core may consist of a filter medium, for example, as disclosed in EP 0 900 118 B1 and WO 02/20135 A2. In such a filter element having a honeycomb structure the fluid flows in such a way that tubular flow channels into which the fluid to be filtered flows at one end are each sealed at the other end, so that the fluid can flow through the peripheral walls of these channels into the neighboring channels whose opposite end is always sealed.

In the embodiment known from EP 0 900 118 B1, FIG. 13, A filter element made of such a filter medium, i.e., having such a filter material core, is provided with a frame. This frame is tightly and fixedly connected to the filter material core at one end and at the other end is provided with holding and sealing means to be tightly accommodated and axially secured in a dividing plane of a divisible filter housing between abutments acting axially on the filter housing parts to be closed in the dividing plane.

The present invention relates to the problem of improving the design and handleability of such a filter element. In addition, a secure position and vibration-damped mounting are to be achieved, namely in particular with respect to use as engine intake air filters in a motor vehicles, in particular in commercial vehicles, which must be suitable for use in an atmosphere having an extremely high dust content, The inventive complex of problems is solved primarily through the design of a generic filter element according to the characterizing features of Patent claim 1.

Advantageous and expedient embodiments of such a filter element and a filter housing suitable for accommodating same are the subjects of the subclaims.

The specific advantages that can be achieved with the present invention are explained below on the basis of exemplary embodiments shown in the drawings.

Figure 1:
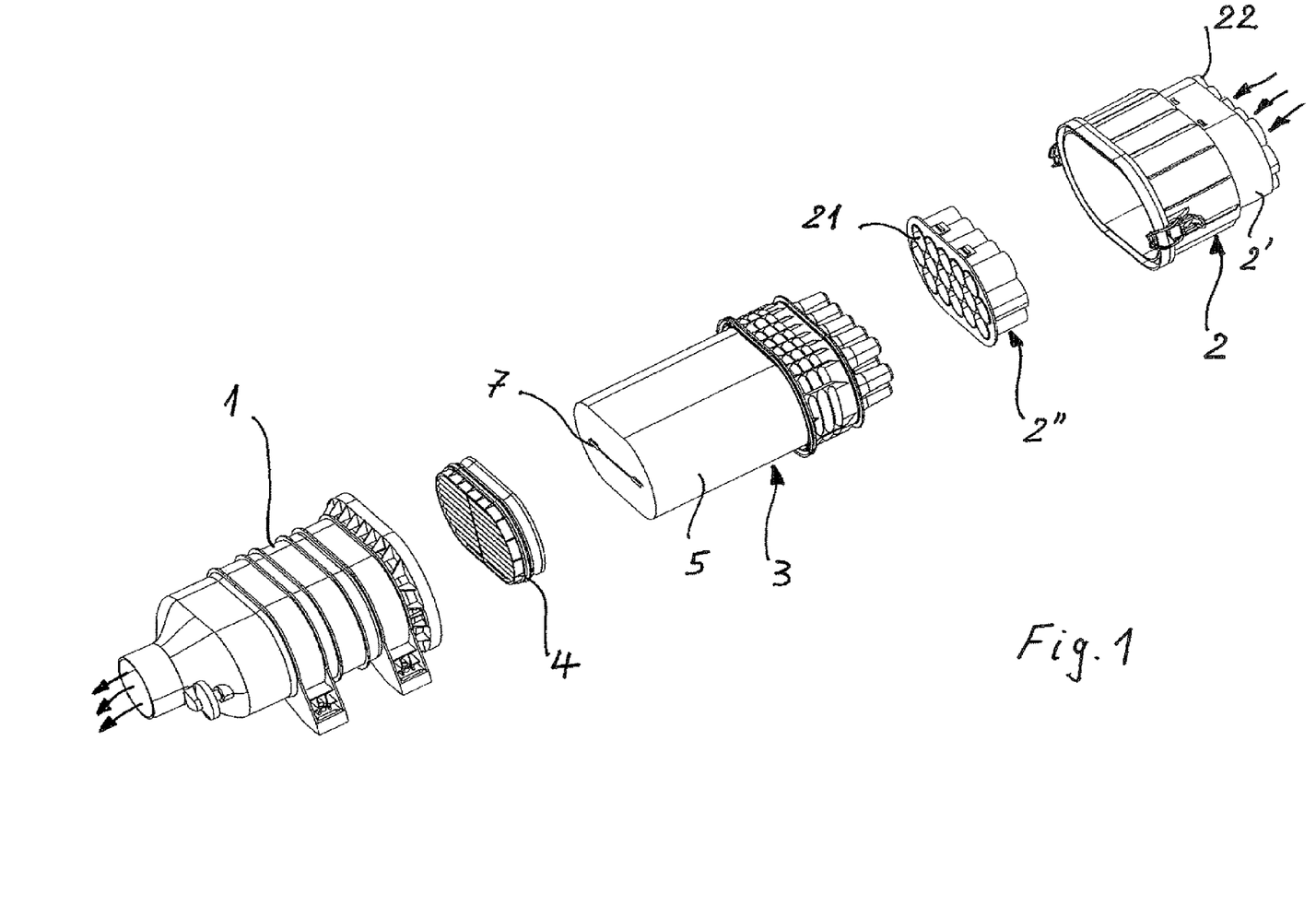
FIG. 1 shows an exploded diagram of a filter housing having a replaceable filter element.

The filter shown in an exploded diagram in FIG. 1 is an engine intake filter of a commercial vehicle. This commercial vehicle in which such a filter is used is one that must be suitable for use in an atmosphere with an extremely high dust content.

The filter housing consists of the first and second housing parts 1, 2. The first housing part 1 constitutes the housing jacket and the second housing part 2 constitutes the housing cover of the filter. Flow through the filter goes in the direction according to the flow arrows shown in FIG. 1, i.e., the air to be filtered enters through the housing cover 2 and leaves the filter housing 1, 2 through the housing jacket. On the path through the filter housing, air as the medium to be filtered passes axially through a filter element 3 and then also leaves the housing jacket of the first filter housing part 1 after also flowing axially through a downstream filter safety insert 4.

Filter element 3 comprises a cylindrical filter material core 5 and a frame 6 surrounding it at one end. The support of the filter material core 5 of the filter element 3 in the frame 6 mounted on its oncoming flow end is explained in greater detail below with reference first to FIG. 2.

Figure 2:
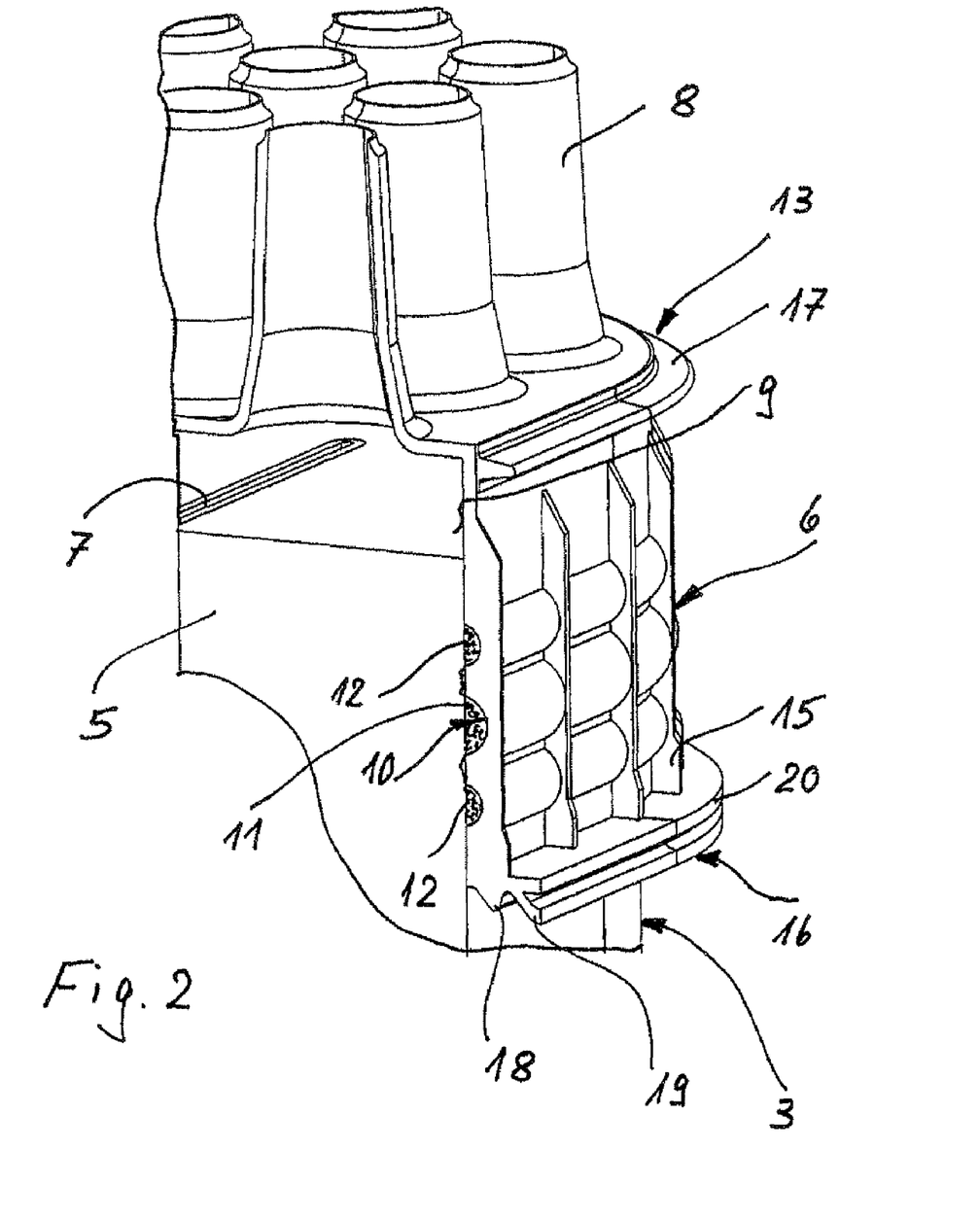
FIG. 2 shows a detail of the oncoming flow end of the filter element according to FIG. 1, shown in a perspective view of a longitudinal section.

The filter material core 5 is a filter medium known from the documents EP 0 900 118 B1 and WO 02/20135 A2, which were cited at the beginning. Such a filter material core 5 is created by winding a double-wall filter sheet around a central core strip 7, which is why such a filter element 3 is also referred to as a coiled filter element. The axial flow channels in the filter medium described in the introduction to the description are formed by the spiral-wound double-wall filter sheet.

Each of the double-wall filter sheets have a smooth continuous outside wall. The alignment of the coiled filter sheet is such that the smooth continuous filter web outside wall comes to lie radially on the outside against the filter element 3.

The frame 6 is designed in the form of a pot in the embodiment shown in FIG. 2. The bottom of the pot contains a plurality of tubular feed connections 8 for the medium to be filtered, i.e., specifically dust-laden air to be cleaned here, which is to be introduced axially into the filter element 3.

The edge area of the pot-shaped frame 6 serves to receive the filter element core 5. The jacket area of the frame 6 has a cylindrical inside wall 9 on the inside into which the filter material core 5 in its coiled form can be inserted. To secure the filter core in the inserted position and to achieve a seal between the outside wall of the filter material core 5 and the inside wall 9 of the frame, the following sealing and fastening measure is taken.

A first annular groove 10 which is open toward the inside radially is provided in the inside wall 9 of the frame 6. A radial filling opening 27 leads radially outward out of this first annular groove 10. This radial opening serves to fill the annular groove 10 from the outside with a foamable filling material 11 that can be foamed inside the annular groove 10. The radial filling opening 27 may be provided with a nonreturn valve 26 (FIG. 7) so that the added filling material is able to foam up in the annular groove 10, which is then sealed automatically, i.e., under the pressure of the foaming filling material—completely filling up the annular groove.

To ensure that the annular groove 10 will be completely filled up and that at the same time there will be a certain penetration into the surface of the outside wall of the filter material core 5, a second annular groove 12 is provided axially adjacent to the first annular groove 10. The cross section of this second annular groove 12 is expediently smaller than that of the first annular groove 10. By providing second annular grooves 12 adjacent to the first annular groove 10, the first annular groove 10 can be provided with excess material in the foam state, because this excess material can flow out into the adjacent second annular grooves 12 with reliable wetting of the outside wall of the filter material core 5. The second annular grooves 12 serve primarily only to receive the excess material escaping from the first annular groove 10 and must and should not be filled completely by the filling material 11.

The frame 6 is made of stable, essentially rigid material and should serve, among other things, as a handle for pulling the filter element 3 out of the first filter housing part 1 when the filter element is changed. As an extraction aid, the frame 6 may be provided with a ring collar 13 on its free axial end, said collar having the function of an extraction handle in this form. This means that the filter element 3 can easily be extracted by hand from the first filter housing part 1 when changing filter elements by gripping such a ring collar 13 as an extraction handle. The ring collar 13 may be the carrier of a second gasket 17 of the filter element 3.

Figure 4:
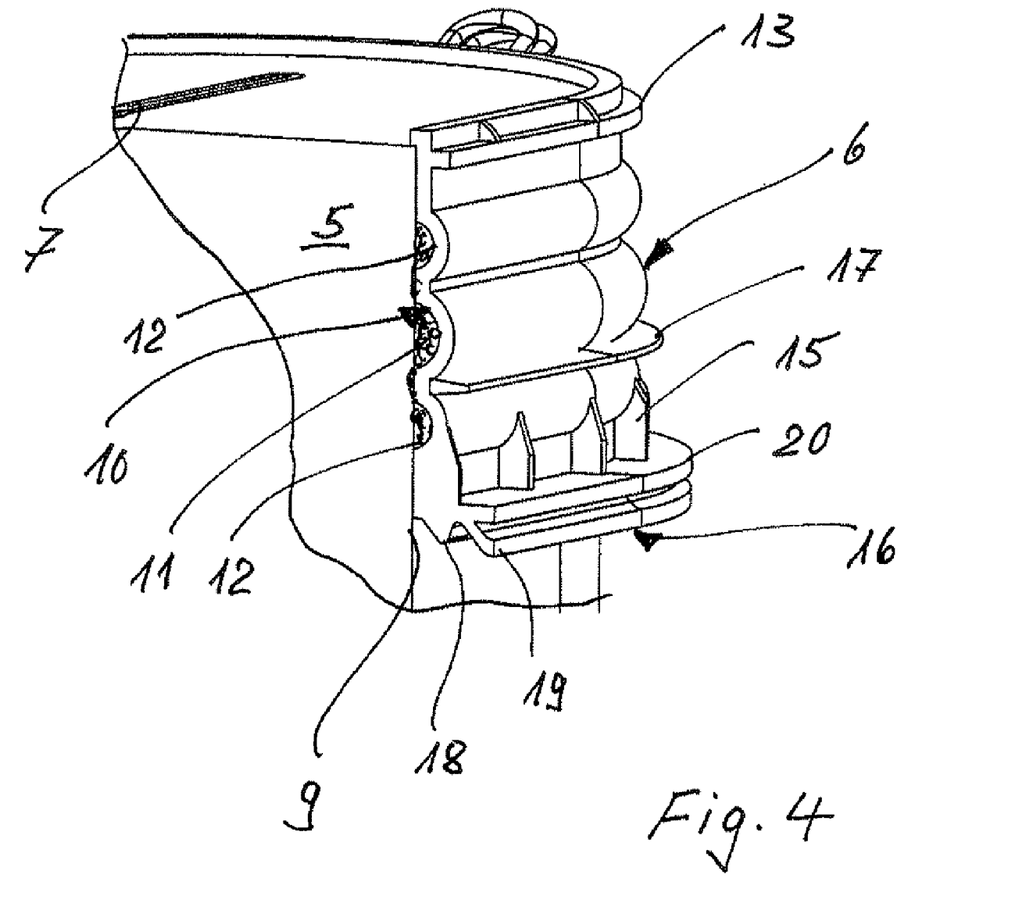
FIG. 4 shows a perspective view of a section through the oncoming flow end of a filter element in an alternative frame design.

The embodiment according to FIG. 4 differs essentially from that according to FIG. 2 only in that the frame 6 there does not have a bottom with an integrally molded feed connection 8. In addition, in the embodiment according to FIG. 4, the second gasket 17 is designed at a distance from the ring collar 13.

The bearing and sealing of the filter element 3 over its frame 6 in the filter housing 1, 2 are described below with respect to the diagram in FIG. 3.

In the assembled state, i.e., when the filter housing 1, 2 is closed, the two filter housing parts 1 and 2 are mutually engaged axially via U-shaped housing ring webs 14 and 15 on each of their ends. The filter housing parts 1, 2 are thereby centered radially.

The filter element 3 is centered radially with respect to the filter housing 1, 2, i.e., specifically with respect to the second filter housing part 2, via adjusting webs 15, which can be seen as such better in FIG. 4 and are integrally molded on the outer jacket of the frame 6.

Elastic gaskets provided on the frame 6 of the filter element 3, preferably integrally molded, provide the seal between the atmosphere outside of the filter housing 1, 2 and the clean room of the filter element 3, namely the first gasket 16 with a sealing effect with respect to the first filter housing part 1 and the second gasket 17 with a sealing effect with respect to the second filter housing part 2.

The first gasket 16 is mounted on the outgoing flow end face of the frame 6. The ring-shaped first gasket 16 has an area 18 on the inside radially and an area 19 on the outside radially. The area 18 that is on the inside radially of the first gasket 16 is in form-fitting connection with the end face of the frame 6. This area 18, which is on the inside radially, serves as an abutment for the frame 6 with respect to an abutment on the housing end in the first housing part 1. A ring web 20 that protrudes radially away from the frame 6 and is situated in the outgoing flow end area of the frame 6 serves as the abutment opposite an abutment on the housing end inside the second housing part 2. When the filter housing 1, 2 is closed, the filter element 3 is clamped in an axially fixed manner via the frame 6 and is secured there practically via the ring web 20 between the two housing parts 1 and 2. Since one of the abutments of the frame 6 facing the filter housing 1, 2 is covered by elastic sealing material of the first gasket 16 in the area of the ring web 20, there is a corresponding elastic axial tension in the ring filter element 3 over its frame 6 within the filter housing 1, 2. The housing ring webs 14, 14' are designed, i.e., coordinated, so that they are not in axial contact with one another when the filter housing 1, 2 is closed, so this avoids a double fit in the axial direction with respect to the frame 6 being supported on its ring web 20.

In the area 19 which is on the outside radially, the first gasket 16 protrudes at an acute angle from the respective end face of the ring web 20 in the direction of flow of the filter. In this area, the first gasket 16 is elastically deformable and is prestressed to such an extent that it exerts an axial sealing effect in particular with respect to a respective abutment of the first housing part 1 when the filter housing is closed. This yields an especially secure seal between the first housing part 1 and the frame 6.

The second gasket 17 is a radial gasket which is connected especially fixedly to the frame 6 and provides a seal between the frame 6 and the second housing part 2.

Figure 3:
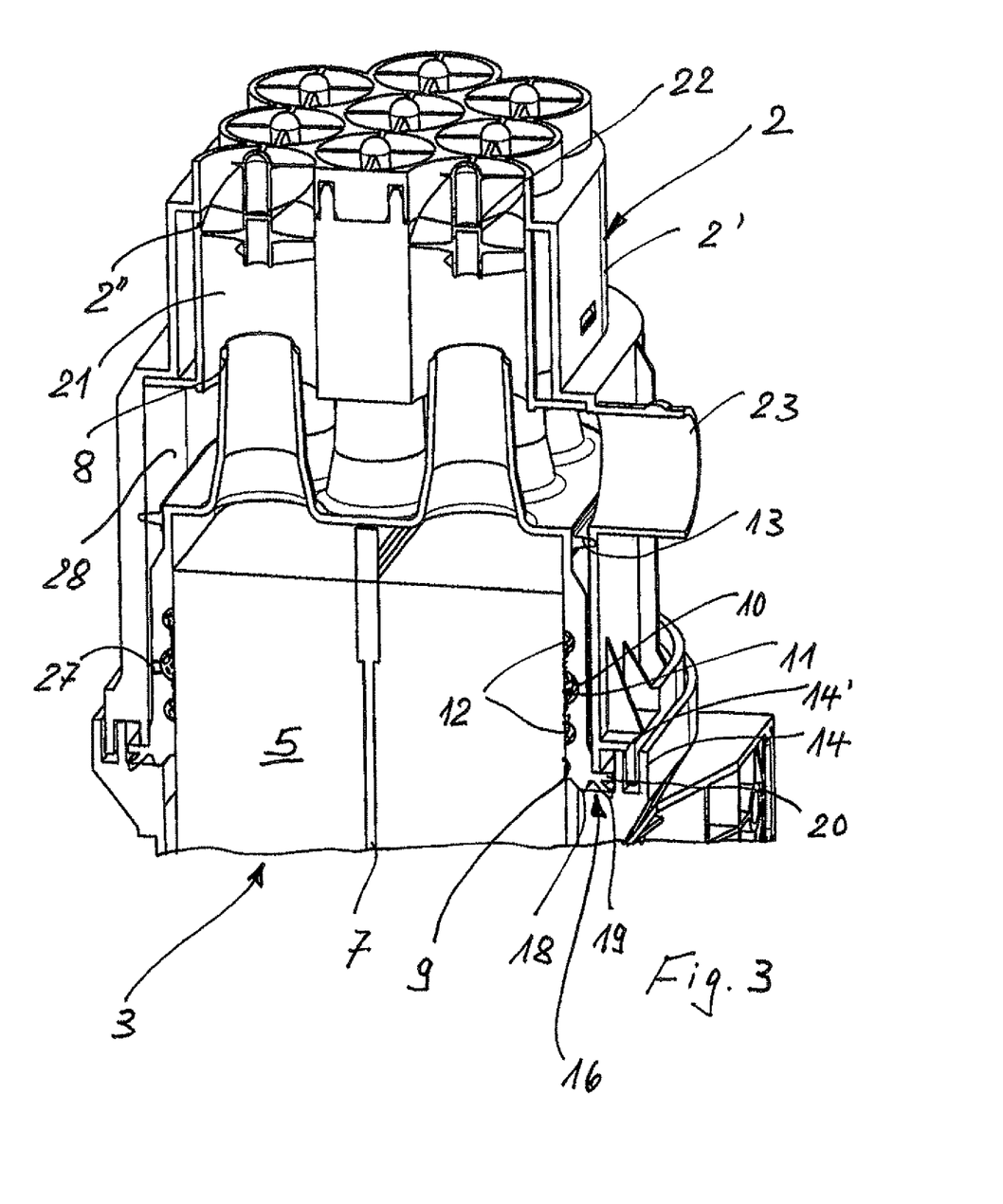
FIG. 3 shows a perspective view of a longitudinal section through the oncoming flow end of the filter housing according to FIG. 1 with the filter element inserted.

Although in the embodiment according to FIG. 3, the second gasket 17 is in direct contact with the oncoming flow end of the filter element 3, in the embodiment according to FIG. 4 it is mounted axially in relatively close proximity to the ring web 20 of the frame 6 to which it is secured axially inside the filter housing 1, 2. Functionally these second gaskets 17 act completely the same regardless of their axial arrangement on the frame.

In the embodiment of the second housing part 2 according to FIG. 3, swirl-producing channels 21 are provided in this oncoming flow in plurality. These channels have a swirl-producing effect because swirl-producing elements 22 are provided in an essentially known manner in them on the oncoming flow end. When the filter housing is closed, the feed connections provided on the bottom of the frame 6 in its embodiment according to FIG. 3 protrude into the swirl-producing channels 21, so that on the whole the result is one separation cyclone per swirl-producing channel 21. In these cyclones, particles of dirt are forced radially outward through the spiral effect, so that they can move in the annular spaces between the feed connections 8 and the swirl-producing channels 21 toward being deposited there. The particles of dirt deposited there can flow out of the aforementioned annular spaces into a dirt-collecting space 28 between the outside walls of the feed connection 8 and the housing wall of the second filter housing part 2. Particulate dirt deposited in the dirt-collecting space 28 can be removed with suction through a closable opening 23 in the second filter housing part 2. The individual cyclones described above then cause a preseparation of dirt accordingly.

An inventive embodiment of such a preseparator through integration of a part of the individual cyclones and to the bottom of the frame 6 of a filter element 3 has the great advantage that the dirt-collecting space 28 is opened automatically within the second housing part 2 when the filter element is replaced in a process in which the filter housing is opened. In this way, dirt particles that are collected there can automatically fall down without having to use a suction exhaust device for this.

In the embodiment of the second filter housing part 2 shown in FIGS. 1 and 3, it is composed of two component elements that are manufactured separately, namely an outside wall 2' of the second filter housing part 2 as the first component element and an insert part 2" forming the second component element. The swirl-producing device 22 is composed of component elements, which are divided among the outside wall 2' on the one hand and the insert part 2" on the other hand. Due to such a division into component elements 2', 2", which must be joined together in assembly of the filter only after being manufactured separately by a mutual locking of them together, for example, these swirl-producing devices 22 can be manufactured extremely economically from a technical manufacturing standpoint. A plurality of swirl-producing devices 22 through which the flow can pass in parallel can be manufactured simply by injection molding two individual components 2', 2".

Figure 5:
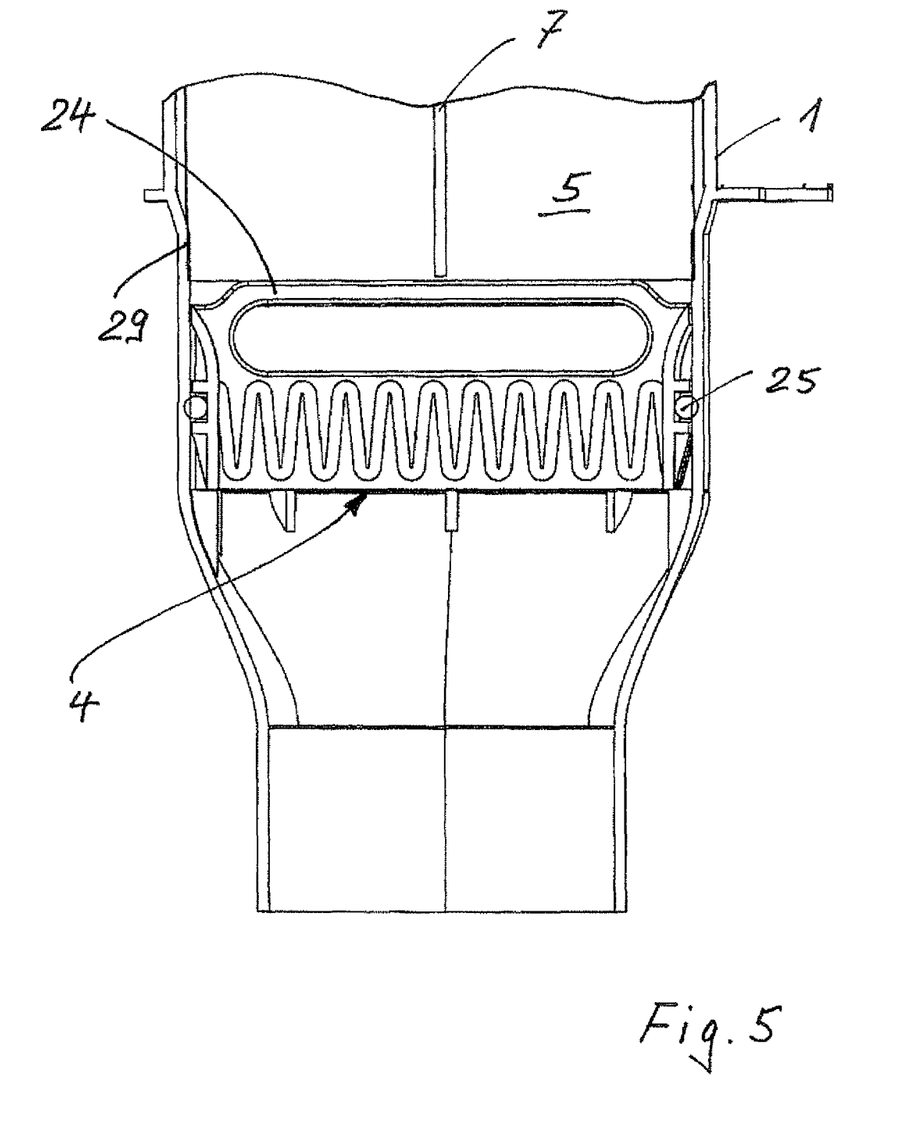
FIG. 5 shows a section through the outgoing flow end of the filter housing according to FIG. 1 with a safety filter element inserted therein.
Figures 6, 7:
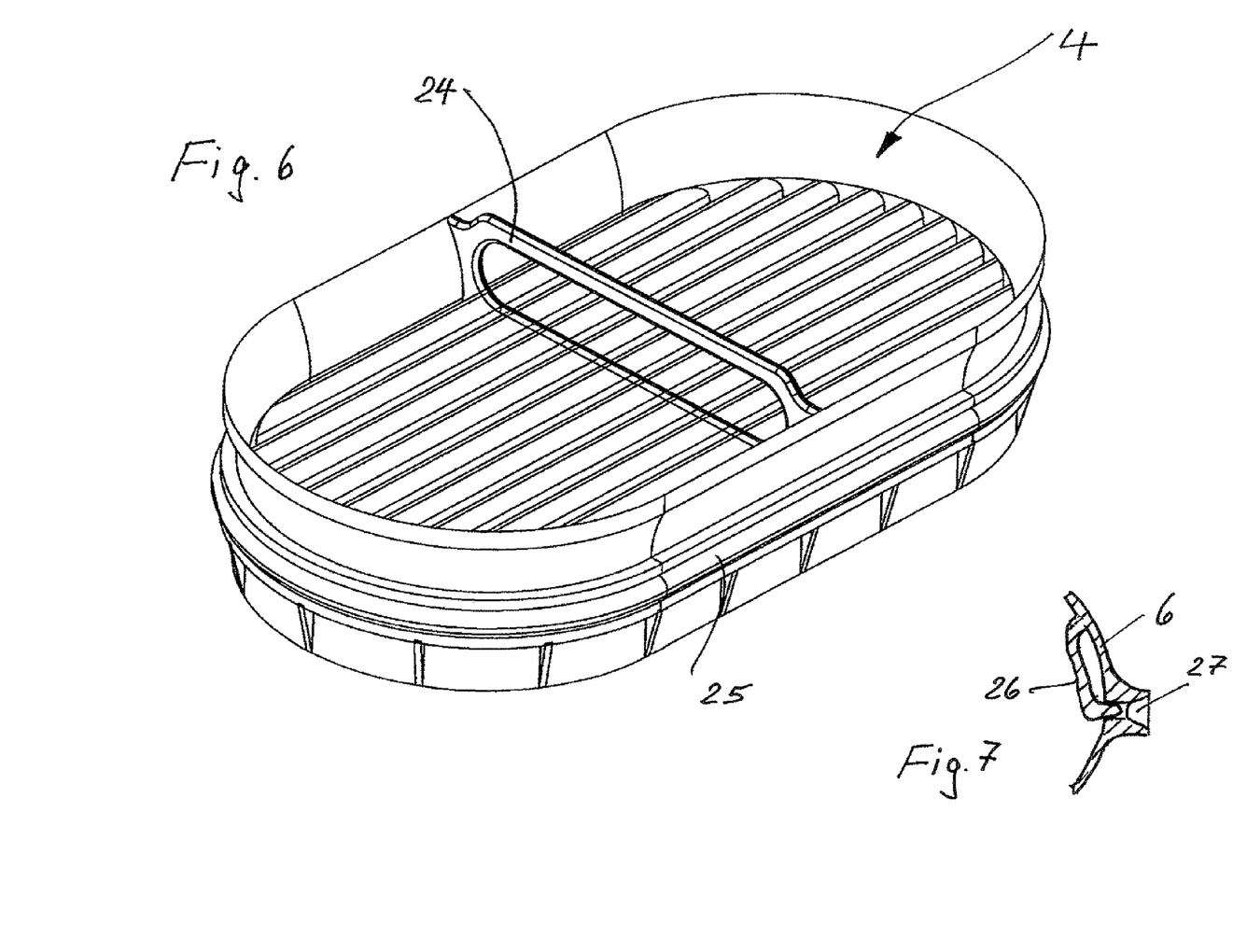
FIG. 6 shows a perspective view of the safety filter element according to FIG. 5 with a view of the oncoming flow side.
FIG. 7 shows a detail of the area of a filling opening into a first annular groove of the filter element frame.

On the outgoing flow end, a filter safety insert 4 has been provided in the first filter housing 1 in accordance with the diagrams in FIGS. 5 and 6. On the oncoming flow end, the safety filter insert 4 is provided with a removable handle 24. On the outside radially, a microcellular rubber gasket 25 has been provided for sealing with respect to the first filter housing part 1.

On the outgoing flow end, the filter element 3 is centered radially by direct contact with a suitably designed section 29 of the first filter housing part, i.e., with a radial inward indentation (FIG. 6).

FIG. 7 shows a possible embodiment of a nonreturn valve 26 in a first annular groove 10. In this embodiment of a nonreturn valve 26, a spring tongue which has a nonreturn action is integrally molded in a plastic embodiment of the frame 6.

All the features described in the description and claimed in the following claims may be essential to the invention either individually or when combined together in any form.

The invention claimed is:

1. A filter element having a cylindrical porous filter material core through which a flow can pass longitudinally and a frame tightly surrounding the core radially at one end and having sealing and holding means by which the filter element is detachably but tightly insertable into a filter housing,
characterized by the features,
the frame comprises at least a first annular groove which is open toward the filter material core,
the first annular groove is filled with a foamed filling material,
the foamed filling material results from a liquid which has been added to the first annular groove that is already in contact with the filter material core through a filling opening provided therein for the purpose of foaming.

2. The filter element according to claim 1 for insertion into a divided filter housing having a first and a second filter housing part,
characterized in that
the frame has at least two gaskets that are separated axially from one another for assignment to either one of the two filter housing parts.

3. The filter element according to claim 2,
characterized in that
at least one of the gaskets protrudes axially away from the frame radially outside so it is an axial distance away from the first gasket for a radial gasket opposite a respective area of the filter housing.

4. The filter element according to claim 1,
characterized in that
the holding means of the frame comprise a radially protruding ring web by means of which the filter element can be clamped axially between the abutments of the divisible filter housing.

5. The filter element according to claim 4,
characterized in that
the frame surrounds the respective end of the filter element on the end, whereby the ring web is spaced a distance apart from this axial end of the frame.

6. The filter element according to claim 4,
characterized in that
the frame surrounds the respective axial end of the filter element in the form of a pot with a plurality of feed connections that are provided in the bottom of the pot and protrude axially outward for the medium to be filtered, which is flowing into the filter element.

7. The filter element according to claim 1,
characterized by the features,
a ring web has at least a first elastic gasket on at least one of its two axial end faces,
the at least first elastic gasket is in form-fitting contact with the ring web in a first area that is on the inside radially, in which the ring web is supported with respect to an abutment on the filter housing end in a state in which it is inserted into the filter housing,
in a second area of the at least first elastic gasket that remains on the outside radially, the gasket is freely deformable elastically and radially for a corresponding deformation when the filter element is inserted into the filter housing within abutments on the filter housing end that are adjacent radially and axially.

8. The filter element according to claim 1,
characterized in that
the first annular groove is axially adjacent to at least one other second annular groove.

9. The filter element according to claim 1,
characterized in that
at least the first annular groove is provided with a filling opening leading radially outward.

10. The filter element according to claim 9,
characterized in that
a nonreturn valve is assigned to the filling opening.

11. An assembly comprising:
a filter element having a cylindrical porous filter material core through which a flow can pass longitudinally and a frame tightly surrounding the core radially at one end and having sealing and holding means,
the frame including at least a first annular groove which is open toward the filter material core,
the first annular groove is filled with a foamed filling material,
the foamed filling material results from a liquid which has been added to the first annular groove that is already in contact with the filter material core through a filling opening provided therein for the purpose of foaming;
at least one divisible filter housing for accommodating the filter element, the filter housing including abutments, only the abutments being provided for axial support of the filter element so that the filter element can be clamped between the abutments; and
wherein the holding means of the frame comprise a radially protruding ring web by means of which the filter element can be clamped axially between the abutments of the divisible filter housing.

12. The assembly according to claim 11, further comprising:
the frame of the at least one filter element surrounding the respective axial end of the filter element in the form of a pot with a plurality of feed connections that are provided in the bottom of the pot and protrude axially outward for the medium to be filtered, which is flowing into the filter element; and further including a second filter housing, the second filter housing serving to accommodate the frame and being provided with inlet channels that generate a spiral flow and are assigned to the feed connections on the end assigned to the feed connections of the filter element frame, whereby these inlet channels together with the respective feed connections of the filter element form separation cyclones in a number corresponding to the number of feed connections.

13. The assembly according to claim 11, the assembly being used for filtering the engine intake air in a motor vehicle.

14. The assembly according to claim 13, characterized in that the holding means of the frame comprise a radially protruding ring web by means of which the filter element can be clamped axially between the abutments of the divisible filter housing.

15. The assembly according to claim 14, characterized by the features, the ring web has at least a first elastic gasket on at least one of its two axial end faces, the at least first elastic gasket is in form-fitting contact with the ring web in a first area that is on the inside radially, in which the ring web is supported with respect to an abutment on the filter housing end in a state in which it is inserted into the filter housing, in a second area of the at least first gasket that remains on the outside radially, the gasket is freely deformable elastically and radially for a corresponding deformation when the filter element is inserted into the filter housing within abutments on the filter housing end that are adjacent radially and axially.

16. The assembly according to claim 15, characterized in that the second gasket protrudes axially away from the frame radially outside so it is an axial distance away from the first gasket for a radial opposite a respective area of the filter housing.

17. The assembly according to claim 16, characterized in that the first annular groove is axially adjacent to at least one other second annular groove.

18. The assembly according to claim 17, characterized in that at least the first annular groove is provided with a filling opening leading radially outward.

19. The assembly according to claim 18, characterized in that a non-return valve is assigned to the filling opening.

20. The assembly according to claim 19, characterized in that the frame surrounds the respective end of the filter element on the end, whereby the ring web is spaced a distance apart from this axial end of the frame.

* * * * *